United States Patent [19]

Fan

[11] Patent Number: 5,495,538
[45] Date of Patent: Feb. 27, 1996

[54] SEGMENTATION-BASED JPEG IMAGE ARTIFACTS REDUCTION

[75] Inventor: Zhigang Fan, Webster, N.Y.

[73] Assignee: Xerox Corporation, Stamford, Conn.

[21] Appl. No.: 401,180

[22] Filed: Mar. 8, 1995

Related U.S. Application Data

[63] Continuation of Ser. No. 68,109, May 28, 1993, abandoned.
[51] Int. Cl.$^6$ .............................. G06K 9/36; G06K 9/46
[52] U.S. Cl. ......................... 382/233; 382/250; 382/262; 382/264; 382/268; 358/433
[58] Field of Search .............................. 382/56, 54, 232, 382/233, 250, 251, 254260, 262, 264, 268; 358/432, 433, 447, 429

[56] References Cited

U.S. PATENT DOCUMENTS

| | | | |
|---|---|---|---|
| 4,965,754 | 10/1990 | Stansfield et al. | 382/56 |
| 4,999,705 | 3/1991 | Puri | 348/412 |
| 5,001,559 | 3/1991 | Gonzales et al. | 348/400 |
| 5,049,991 | 9/1991 | Niihara | 348/416 |
| 5,121,216 | 6/1992 | Chen et al. | 382/56 |
| 5,127,021 | 6/1992 | Schreiber | 375/200 |
| 5,129,015 | 7/1992 | Allen et al. | 382/167 |
| 5,241,395 | 8/1993 | Chen | 382/56 |

FOREIGN PATENT DOCUMENTS 0590922  4/1994  European Pat. Off. .

OTHER PUBLICATIONS

A. Zakhor, IEEE Transactions on Circuits and Systems for Video Technology, "Iterative procedures for reduction of blocking effects in transform image coding", Mar. 1992, vol. 2, No. 1, pp. 91–95.

R. Rosenholtz et al., Image Processing Algorithms and Techniques II, SPIE, "Iterative procedures for reduction of blocking effects in transform image coding", 1991, vol. 1452, pp. 116–126.

A. Baskurt et al., Signal Processing, "Iterative constrained restoration of DCT–compressed images", Jul. 1989, vol. 17, No. 3, pp. 201–211.

J. S. Lee, Computer Vision Graphics and Image Processing, "Digital Image Smoothing and the Sigma Filter", Nov. 1983, vol. 24, No. 2, pp. 255–269.

M. Ibrahim Sezan and A. Murat Tekalp, "Adaptive Image Restoration with Artifact Suppression Using the Theory of Convex Projections," IEEE Trans. Acoust., Speech, Signal Processing, vol. 38, pp. 181–185, Jan. 1990.

*Primary Examiner*—Leo Boudreau
*Assistant Examiner*—Phuoc Tran
*Attorney, Agent, or Firm*—Oliff & Berridge

[57]  ABSTRACT

A method for reducing ringing and blocking artifacts in a decompressed image models an image in a relatively small area as several smooth regions separated by edges. The method uses JPEG MxM pixel blocks and is compatible with JPEG decompression. To reduce ringing, a block is examined for uniformity, segmented and smoothed. Then, after a DCT transform, a projection is performed to guarantee that the DCT coefficients of the resulting image block will be within the initial quantization interval. The resultant image is produced by an inverse DCT. To reduce blocking, the method is modified to employ a large outer window for uniformity checking, segmentation and smoothing and a small inner window for DCT projection.

21 Claims, 6 Drawing Sheets

IMAGE DATA

| 216 | 218 | 215 | 93  | 39  | 145 | 96 | 173 |
|-----|-----|-----|-----|-----|-----|----|-----|
| 218 | 217 | 216 | 122 | 42  | 61  | 61 | 163 |
| 218 | 218 | 217 | 201 | 90  | 41  | 37 | 41  |
| 218 | 218 | 218 | 218 | 214 | 170 | 68 | 53  |
| 218 | 217 | 213 | 146 | 137 | 196 | 99 | 169 |
| 218 | 218 | 212 | 78  | 39  | 130 | 86 | 172 |
| 218 | 218 | 217 | 143 | 47  | 42  | 41 | 49  |
| 218 | 218 | 218 | 214 | 151 | 74  | 43 | 52  |

FIG.2A
PRIOR ART

DCT VALUES

| 157 | 430  | 83  | −109 | −34 | −28 | 94  | −41 |
|-----|------|-----|------|-----|-----|-----|-----|
| 10  | −40  | 56  | −18  | −13 | −6  | 22  | −11 |
| −73 | 34   | 63  | −58  | −5  | 21  | −8  | 3   |
| 14  | −116 | 160 | −1   | −75 | −35 | 78  | −16 |
| 108 | −53  | −86 | 72   | 10  | −28 | 9   | −4  |
| −27 | 50   | −52 | 25   | −14 | 22  | −19 | 4   |
| −3  | −3   | 9   | 0    | −8  | 4   | 2   | −5  |
| −22 | 20   | 3   | −14  | −2  | 19  | −8  | −8  |

FIG.2B
PRIOR ART

Q-TABLE

| 16 | 11 | 10 | 16 | 24  | 40  | 51  | 61  |
|----|----|----|----|-----|-----|-----|-----|
| 12 | 12 | 14 | 19 | 26  | 58  | 60  | 55  |
| 14 | 13 | 16 | 24 | 40  | 57  | 69  | 56  |
| 14 | 17 | 22 | 29 | 51  | 87  | 80  | 62  |
| 18 | 22 | 37 | 56 | 68  | 109 | 103 | 77  |
| 24 | 35 | 55 | 64 | 81  | 104 | 113 | 92  |
| 49 | 64 | 78 | 87 | 103 | 121 | 120 | 101 |
| 72 | 92 | 95 | 98 | 112 | 100 | 103 | 99  |

FIG.2C
PRIOR ART

QUANTIZED DCT VALUES USING Q-TABLE

| 10 | 39 | 8 | -7 | -1 | -1 | 2 | -1 |
|---|---|---|---|---|---|---|---|
| 1 | -3 | 4 | -1 | -1 | 0 | 0 | 0 |
| -5 | 3 | 4 | -2 | 0 | 0 | 0 | 0 |
| 1 | -7 | 7 | 0 | -1 | 0 | 1 | 0 |
| 6 | -2 | -2 | 1 | 0 | 0 | 0 | 0 |
| -1 | 1 | -1 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG.2D
PRIOR ART

DCT COEFFICIENTS (MULTIPLY FIG.2C VALUES BY FIG.2D)

| 160 | 429 | 80 | -112 | -24 | -40 | 102 | -62 |
|---|---|---|---|---|---|---|---|
| 12 | -36 | 56 | -19 | -26 | 0 | 0 | 0 |
| -70 | 40 | 64 | -48 | 0 | -1 | 0 | 0 |
| 14 | -119 | 154 | 0 | -51 | 0 | 80 | -1 |
| 108 | -44 | -74 | 56 | 0 | 0 | 0 | 0 |
| -24 | 35 | -55 | 0 | 0 | 0 | 0 | 0 |
| 0 | 0 | 0 | 0 | 0 | 0 | 0 | 0 |
| 0 | 0 | 1 | 0 | 0 | 0 | 0 | 0 |

FIG.3A
PRIOR ART

DECOMPRESSED IMAGE

| 220 | 214 | 220 | 102 | 45 | 137 | 97 | 180 |
|---|---|---|---|---|---|---|---|
| 220 | 231 | 204 | 119 | 37 | 64 | 62 | 145 |
| 204 | 237 | 212 | 192 | 111 | 61 | 25 | 55 |
| 205 | 224 | 225 | 228 | 187 | 156 | 64 | 58 |
| 229 | 207 | 213 | 155 | 133 | 197 | 121 | 165 |
| 224 | 199 | 206 | 96 | 40 | 123 | 74 | 168 |
| 211 | 211 | 213 | 141 | 60 | 66 | 11 | 82 |
| 221 | 234 | 214 | 212 | 143 | 85 | 25 | 53 |

FIG.3B
PRIOR ART

SEGMENTATION-BASED JPEG IMAGE ARTIFACTS REDUCTION

This is a Continuation of application Ser. No. 08/068,109 filed May 28, 1993, now abandoned.

BACKGROUND OF THE INVENTION

1. Field of the Invention

The invention is directed to a method of decompressing images compressed in accordance with the Joint Photographic Expert Group (JPEG) proposed adaptive discrete cosine transform (ADCT) standard. More particularly, the invention is directed to a method of reducing decompression artifacts in document-type images resulting from decompression of standard JPEG ADCT compressed images.

2. Description of Related Art

Data compression is required in data handling processes when too much data is present for practical applications. Commonly, data compression is used in communication links, where the time to transmit is long or where bandwidth is limited. Another use for data compression is in data storage to substantially reduce the amount of media space required to store data. Data compression is also used in digital copiers, which require intermediate storage for copier functions such as collation and reprinting. Generally, scanned images, i.e., electronic representations of hard copy documents, require large amounts of data and thus are desirable candidates for data compression.

A number of different compression techniques exist, and many of these are proprietary to individual users. However, standards among the various techniques are desirable to enable communication between data handling devices. With the advent of multimedia communication, formerly dissimilar devices are and will be required to communicate. For example, it is desirable to enable facsimile machines to directly communicate with printers. Presently, compression standards are generally distinct for different data handling devices such as these. Thus, common data compression standards are needed.

Three major schemes for image compression are currently being studied by international standardization groups. A first scheme, for facsimile type image transmission that is primarily binary, is under study by the JBIG (Joint Binary Image Group) committee. A second scheme is being developed for television and film by the MPEG (Motion Pictures Expert Group.) For non-moving images, i.e., still images that are more general than those covered by JBIG, the JPEG (Joint Photographic Expert Group) is developing a device independent compression standard, which uses an adaptive discrete cosine transform (ADCT) scheme.

ADCT is described for example by W. H. Chen and C. H. Smith in "Adaptive Coding of Monochrome and Color Images", IEEE Trans. Comm., Vol. COM-25, pp. 1285–1292, November 1977. ADCT is the method disseminated by the JPEG committee and is a lossy system that reduces data redundancies based on pixel to pixel correlations. Generally, an image does not change significantly on a pixel to pixel basis. Further, it is presumed that an image has a "natural spatial correlation." In natural scenes, correlation is generalized but not exact because noise makes each pixel differ somewhat from neighboring pixels.

Typically, as shown in FIG. 1, the process of data compression utilizes a tile memory 10 storing an M×M tile of the image. For illustrative purposes, square tiles based on the JPEG recommendations are used in this description, but the inventive method can be performed with any form of tiling. From the portion of the image stored in tile memory 10, a frequency space representation of the image is formed at a transformer 12 using the discrete cosine transform (DCT.) For implementation, hardware is used such as the C-Cube Microsystems CL550A JPEG image compression processor, which operates in either the compression or the decompression mode according to the proposed JPEG standard. A divisor/quantization device 14 obtains a quantized DCT value from a set of values known as a Q-Table, stored in a Q-Table memory 16, by dividing a distinct Q-Table value into the DCT value. The integer portion of the divided value is returned as the quantized DCT value. A Huffman encoder 20 then statistically encodes the quantized DCT values to generate a compressed image that is output for storage, transmission, or the like.

The current ADCT compression method divides an image into M ×M non-overlapping pixel blocks, where M=8. The selection of M=8 is a compromise, in which the larger the given block results in a higher obtainable compression ratio. However, a larger block is more likely to have noncorrelated pixels within the block, thereby reducing the compression ratio. If the block is smaller, greater pixel correlation within the block is possible but with less overall data compression. Within a document image particularly, edges of the image are more likely to be encountered within an 8×8 block than in a scene forming a natural image. Thus, for document images, the assumption of a natural spatial correlation fails to some extent. Therefore, although the assumptions of the ADCT proposal work well for photographs containing continuous tones and many levels of gray pixels, these assumptions often work poorly for the reproduction of document images, which have significant high frequency components and many high contrast edges.

Compression schemes commonly use a set of basis functions to utilize intra-block correlations. Basis functions define image data as a projection onto a set of orthogonal functions on an interval. ADCT uses cosine functions as the basis functions and DCT as the projection step. In the first step of the ADCT standard, the image is tiled into 8×8 blocks. Within each block, a set of 64 DCT coefficients is determined for the pixels in the block. The DCT coefficients represent the coefficients of each cosine term of the discrete cosine transform of the 8×8 block.

Referring now to FIG. 2A, an array of 64 gray level values representing 64 pixels in an 8×8 block of the image is shown. This 8×8 block is transformed according to the JPEG ADCT specifications resulting in the DCT coefficients shown in FIG. 2B. These coefficients still completely describe the image data of FIG. 2A, but, in general, larger values cluster at the top left corner in the low spatial frequency region. Simultaneously, the coefficient values in the lower right hand portion of the grid tend towards zero. This clustering occurs in the vast majority of images as the frequency of the image increases.

Generally, the human eye sees low frequencies in an image best. At higher frequencies, changes from amplitude to amplitude are unnoticeable, unless such changes occur at extremely high contrast. This is a well known effect of the human visual system and extensively documented, see e.g. "Visual Performance and Image Coding" by P. Roetling, *Proceedings of the S.I.D.* 17/2 pp. 111–114 (1976). The ADCT method uses the fact that small amplitude changes at high frequencies are unnoticeable and therefore can be generally ignored.

The next step in the ADCT method uses a quantization or Q-matrix. The Q-matrix shown in FIG. 2C is a standard JPEG-suggested matrix for compression, but ADCT, as well as the method claimed herein, can also operate using other Q-matrices (or Q-Tables.) The matrix incorporates the effect that low frequencies are roughly more important than high frequencies by introducing larger quantization steps, i.e. larger entries for larger frequencies. However, the table also attempts to internally construct some desirable variations from the general assumption. Accordingly, the values in the table vary with frequency. The exact perceived variation would be a function of the human visual system corresponding to the document type expected, i.e. photo, text or graphic, or of some other application dependent parameter. Each of the DCT values from FIG. 2B is divided by a corresponding Q-matrix value from FIG. 2C resulting in quantized DCT (QDCT) values by using the following relationship:

$$QDCT[m][n]=INT\{DCT[m][n] \div Q\text{-Table}[m][n]+½\}$$

where INT{} denotes the integer part of the function.

The term division used herein describes the process detailed in ADCT including the methods for handling truncation and round-off.

The quantized DCT values are shown in FIG. 2D. The remainder from the division process is discarded, resulting in a loss of data. Furthermore, since the Q values in the lower right hand portion of the table in FIG. 2C tend to be high, most of the values in that area go to zero as shown in FIG. 2D, unless there were extremely high amplitudes of the image at the higher frequencies.

After deriving the quantized set of DCT values shown in FIG. 2D, pixels are arranged in the order of a space filling zigzag curve. A statistical encoding method, such as the Huffman process, is used to generate the signal to be transmitted. This statistical coding is performed in a lossless way, and the only loss introduced in the compression is the one generated by the quantization of the DCT coefficients using the Q-Table.

ADCT transforms are well known, and existing hardware that performs the transform on image data is shown for example in U.S. Pat. No. 5,049,991 to Nihara, U.S. Pat. No. 5,001,559 to Gonzales et al., and U.S. Pat. No. 4,999,705 to Puri. The primary thrust of these particular patents, however, is moving picture images, not document images.

To decompress the now-compressed image, a series of functions or steps are followed reverse of the compression as shown in FIG. 1. The Huffman encoding is removed at decoder 50. The image signal then represents the quantized DCT coefficients, which are multiplied at signal multiplier 52 by the Q-Table values in memory 54 in a process inverse to the compression process. At inverse transformer 56, the inverse transform of the discrete cosine transform is derived, and the output image in the spatial domain is stored at image buffer 58.

In the described decompression method, Huffman encoding is removed to obtain the quantized DCT coefficient set. From the quantized DCT coefficients and the Q-Table, the quantization interval, i.e., the DCT constraints, are determined. Specifically, the upper and lower boundaries are determined by the relationships:

lower bound $DCT[m][n]=(QDCT[m][n]-0.5) \times Q\text{-Table }[m][n]$;

and upper bound $DCT[m][n]=(QDCT[m][n]+0.5) \times Q\text{-Table}[m][n]$.

The center value of each range of upper and lower boundaries is used to calculate the DCT coefficient. In other words, each member of the set is multiplied by a Q-Table value resulting in the DCT coefficients shown in FIG. 3A by using the data of FIGS. 2C and 2D in the following relationship:

$$DCT[m][n]=QDCT[m][n] \times Q\text{-Table}[m][n].$$

However, the result shown in FIG. 3A is not the original set of DCT coefficients shown in FIG. 2B because the remainders calculated for the original quantization of the DCT coefficients with the Q-Table in the compression process have been lost. In a standard ADCT decompression process, the inverse discrete cosine transform of the set of DCT coefficients is derived to obtain image values shown in FIG. 3B.

The above described process is unable to reproduce an extremely accurate image. The original image cannot be reproduced since data within the image was discarded in the compression-quantization step. Poor reproduction is noted wherever strong edges appear, which are commonly present in text. In particular, "ringing artifacts," also called "mosquito noise," are apparent at the strong edges. These problems occur in text, graphics and halftones, components very common in document images. In addition to mosquito noise or ringing artifacts, a blocking artifact often appears in image areas having slowly varying grays, where each M×M block that formed the calculation of the compression basis is visible. Both artifacts detract from the accuracy and quality of the reproduction.

To remove such artifacts, two methods have been proposed. In a first method, the decompressed image is post-processed, i.e., after the image has been fully decompressed, an attempt is made to improve the image. Of course, such post-processing can never retrieve the original image, because that image has been lost. Moreover, post-processing of the image leads to a reconstructed image, which differs from the real source image, and subsequent compression/decompression steps possible in electronic imaging applications will lead to potentially larger and larger deviations between the reconstructed and original image. Such a process is demonstrated in the article "Reduction of Blocking Effects in Image Coding" by Reeve, III et al., Optical Engineering, January/February, 1984, Vol. 23, No. 1, p. 34, and "Linear Filtering for Reducing Blocking Effects in Orthogonal Transform Image Coding", by C. Avril et al., Journal of Electronic Imaging, April 1992, Vol. 1(2), pp. 183–191.

The second method employs an iterative decoding process using the known bandlimit of the data. In this method using the compressed form of the image again, different blocks, perhaps 32×32, are used to decode the image. In one example, a method of blurring the overall image was considered with the goal that such blurring would tend to smooth out the blocking artifacts. See "Iterative Procedures for Reduction of Blocking Effects in Transform Image Coding", by Rozenholtz et al., SPIE, Vol. 1452, Image Processing Algorithms and Techniques II, (1991), pp. 116–126.

All of the references cited above are incorporated herein by reference for their teachings.

SUMMARY OF THE INVENTION

It is therefore an object of this invention to provide a method for reducing ringing artifacts in a decompressed image.

It is also an object of this invention to provide a method for reducing blocking artifacts in a decompressed image.

A further object of this invention is to provide a method for reducing artifacts that is compatible with JPEG decompression.

An additional object of this invention is to provide a method of reducing artifacts that allows a processed image to be compressed with the same results as achieved from compression of an original image.

Another object of this invention is to provide a method for reducing artifacts that does not significantly increase computation costs.

The above and other objects are achieved by a method of removing artifacts from a decompressed image, comprising the steps of first providing a plurality of pixel blocks of image data in an image and examining each pixel block for uniformity. Then, regions of pixels in each pixel block are formed. Each region is smoothed by replacing each pixel value with an average pixel value of the region. Next, a discrete cosine transform is performed followed by a projection to guarantee that the DCT coefficients of the smoothed image will be within the quantization interval. Finally, the decompressed data are produced by an inverse discrete cosine transform.

To reduce the blocking artifact, the method is modified to create a large outer window surrounding a small inner window of image data. The uniformity check, segmenting and smoothing are performed on the large window. The small window is used for the DCT operations.

BRIEF DESCRIPTION OF THE DRAWINGS

These and other aspects of the invention will become apparent from the following description of preferred embodiments of the invention in conjunction with the accompanying drawings in which:

FIG. 2A shows an 8×8 block of image data to be compressed by the prior art process of FIG. 1;

FIG. 2B shows the determined discrete cosine values providing a frequency space representation of the image of FIG. 2A;

FIG. 2C shows the default Q-Table used in the examples of FIGS. 2A and 2B;

FIG. 2D shows the determined quantized discrete cosine values using the Q-Table of FIG. 2C;

FIG. 3A shows the DCT values regenerated from the data of FIG. 2D by use of the Q-Table of FIG. 2C;

FIG. 3B shows the corresponding 8×8 reconstructed image data block from the prior art process of FIG. 1;

DETAILED DESCRIPTION OF PREFERRED EMBODIMENTS

In the preferred embodiment, the invention employs a method that uses JPEG M×M pixel blocks, preferably where M=8. Each block is referred to as a window, and the method works window by window.

As described in the background, the quantized DCT values are determined for the pixels within a block, as in FIG. 2D. The DCT constraints and the initial DCT coefficients are then calculated using the Q-table, as in FIG. 2C, and the quantized DCT values, as in FIG. 2D. An inverse discrete cosine transform of the initial DCT coefficients, as in FIG. 3A, yields initial pixel values for the window.

Figure 1:
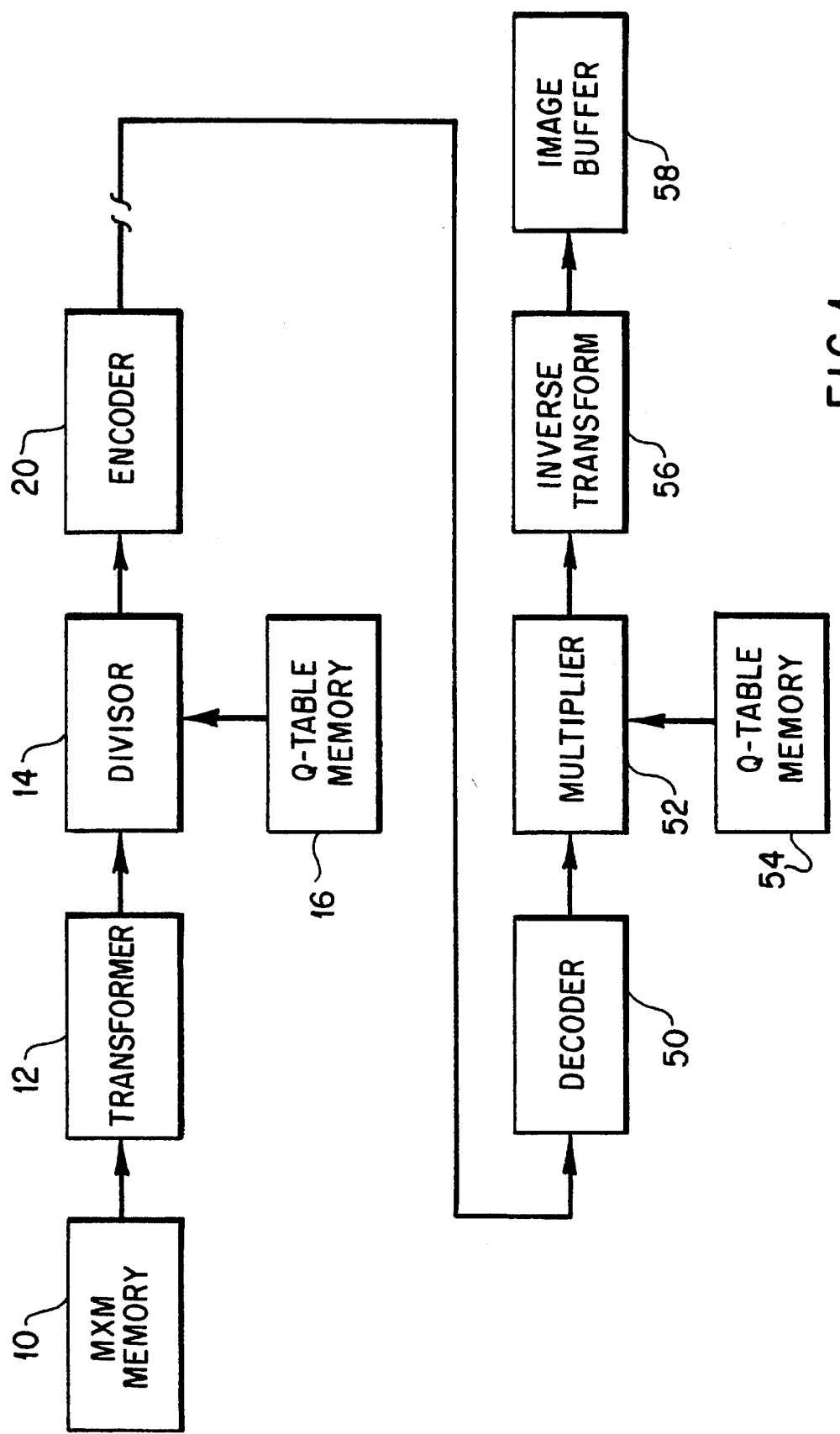
FIG. 1 shows a functional block diagram for the prior art ADCT compression/decompression process.
Figure 4:
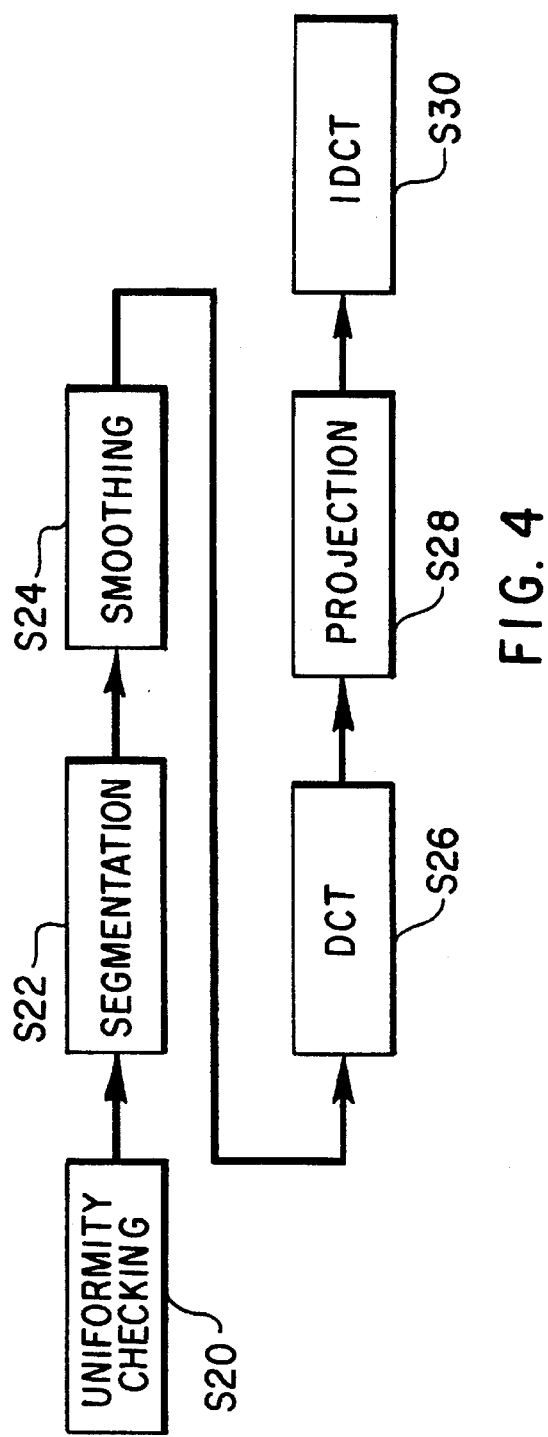
FIG. 4 shows a flow chart of the process of the present invention.

Referring to FIG. 4, in the step S20 of the method, a window is examined to see whether it is uniform. If the dynamic range of the pixels in the window does not exceed a pre-set threshold, the window is considered to be uniform, and no further processing is required. If the preset threshold is exceeded, i.e. the window is not uniform, the window is segmented into several regions at step 522. The pixel values within a region are then changed by a smoothing operation at step 524. The smoothing operation is accomplished by low pass filtering. For example, a suitable smoothing operation is to replace the individual pixel values by the average pixel value of that region.

Next, at step 526, a DCT transform is performed on the "smoothed" image data to determine the resulting DCT coefficients for the pixels in the window. Following the DCT transform, a projection is performed at step 528 to guarantee that the resulting DCT coefficients of the resulting image window will be within the initial quantization interval. Finally, at step 530, an inverse DCT produces the result.

The preceding description is mainly conceptual, and the actual implementation could vary in different ways. For example, if a DCT domain error measure is used for deciding the number of regions, the smoothing and the DOT transform are performed as a part of segmentation, as described in more detail below.

Segmentation

Numerous segmentation methods are known. Most segmentation methods, even some very primitive methods, perform reasonably well in the present invention because the method employs small windows, within which the image content is relatively simple. First, the number of uniform regions within a window must be determined. If prior knowledge is not available, the number is typically estimated during segmentation.

Conventionally in the prior art, the number of regions is determined by applying spatial domain error criteria, such as between-region and within-region distances. For example, in the splitting-type segmentation, a region will not further split if it is found to be quite homogeneous or the within-distance is small. While in the merging type segmentation, two regions will not merge into one if they are quite different or the between-distance is large. These approaches are not useful when the compression ratio is high.

Therefore, in this invention, the spatial domain error criteria is combined with the DCT domain error measures to examine how accurately the segmentation results fit within the given DCT constraints. This method exploits the strength of the DCT domain approach without increasing computational costs.

Figure 5:
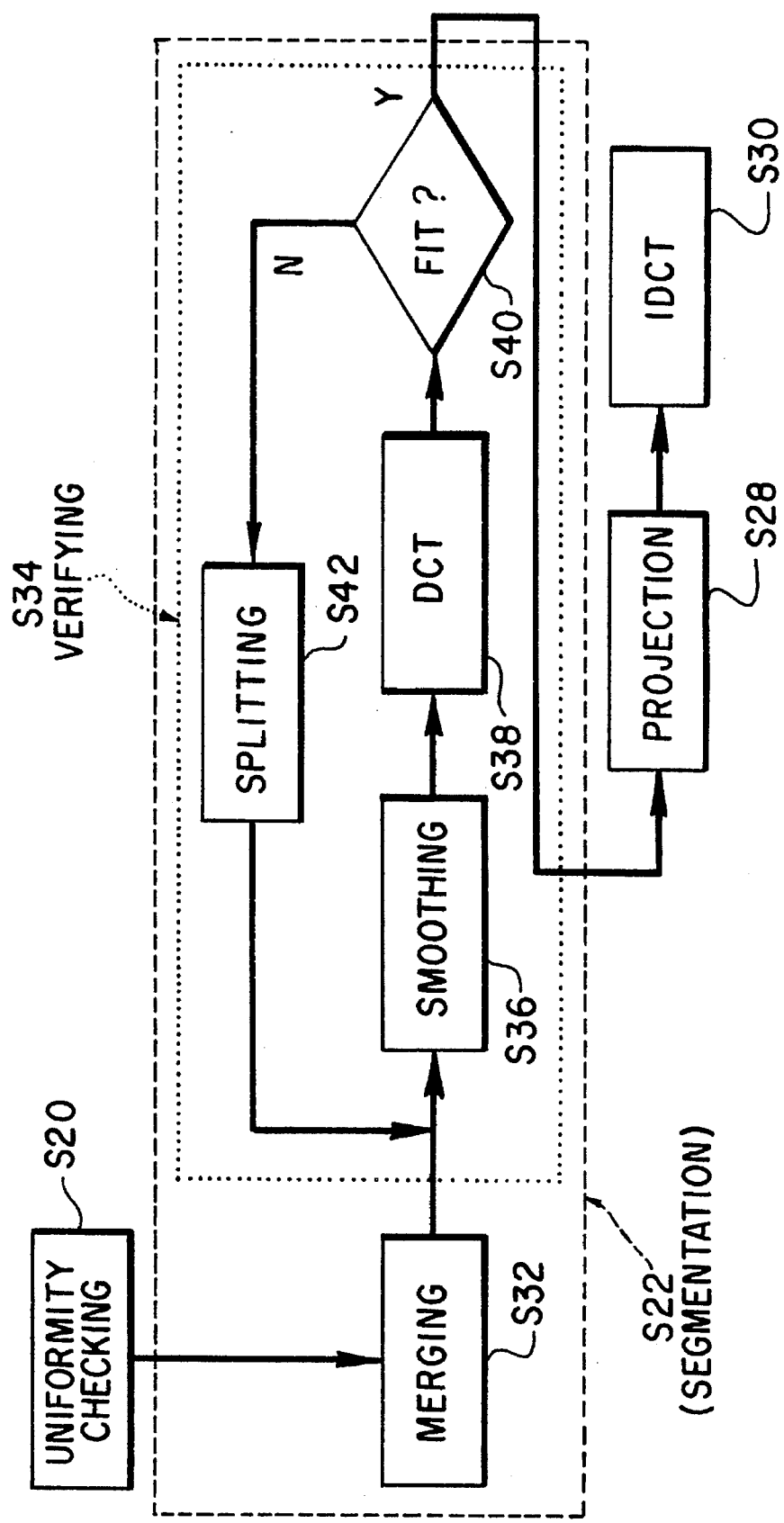
FIG. 5 shows segmentation according to the invention.

According to this invention, segmentation is a two step procedure: a bottom up merging step followed by a top down verifying step as shown in FIG. 5. In the merging step S32, an initial grouping is formed such that each group, called a region, contains connected pixels such that the neighboring pixels within a region have an intensity difference smaller than a pre-set threshold drain. The regions then merge in sequence, first combining the neighboring region pair with the minimum difference in mean (or other error measurements.) This merging process repeats until the number of regions becomes one or the minimum difference between neighboring regions exceeds a threshold $d_{max}$. At the end of the merging step, it is assumed that $N_{min}$ regions exist.

In the verifying step S34, the process begins with the $N_{min}$ regions. The pixel values within each region are replaced by a smoothing operation S36, which is discussed in detail below. A DCT is then performed at S38. At step S40, it is determined if the resulting DCT coefficients are within or close to the DCT constraints. If so, the verifying step S34 and the whole segmentation S22 completes. Otherwise, one of the regions is partitioned into two at step S42, and the verifying process S34 repeats.

The partitioning process is accomplished in the reverse order of the merging process, i.e., the last formed region during the merging step splits first. The process stops after either a DCT fit is found or the number of regions reaches $N_{max}$, which is the number of regions in the initial grouping.

Smoothing

After a window is segmented into K regions, for example, each region is smoothed separately. The pixels on the boundaries of the regions usually have larger modeling and segmentation errors than the pixels in the interior. Therefore, it is preferable to treat them differently. Generally, the boundary pixels should be smoothed less than the interior pixels. In this invention, the interior pixels adopt the mean value of the region, while the values of the boundary pixels are replaced by a combination of their original value and the region mean specified as follows:

$$y(m,n) = \alpha \times y(m,n) + (1-\alpha) \times \mu$$

where $y(m,n)$ is the value of a boundary pixel at position $(m,n)$, $\mu$ is the mean of the region that pixel $(m,n)$ belongs to, and $\alpha$ is a pre-set factor satisfying $0 \leq \alpha \leq 1$.

There are numerous alternatives. For instance, boundary pixels can be smoothed locally with a small neighborhood. A more sophisticated method uses POCS (Projections Onto Convex Sets) technique to interactively "improve" the boundary pixel values to find a best fit to DCT constraints.

Projection

The result of smoothing yields a more desirable image (window) in terms of fitting to the model. Nevertheless, the DCT of this desirable image window does not necessarily satisfy the DCT constraints. Therefore, the projection operation is then performed as specified by the following:

$$z(u,v) = U(u,v), \text{ if } Y(u,v) > U(u,v);$$

$$Z(u,v) = L(u,v), \text{ if } Y(u,v) < L(u,v);$$

$$Z(u,v) = Y(u,v), \text{ otherwise.}$$

where $L(u,v)$ and $U(u,v)$ are the lower and upper DCT bounds respectively, $Y(u,v)$ is the desirable DCT value, and $Z(u,v)$ is the output of projection for $(u,v)$ DCT components.

Thus, the projecting step includes comparing the resulting DCT coefficients to the initial quantization interval and then, if necessary, correcting the resulting DCT coefficients to fit within the initial quantization interval.

BLOCKING ARTIFACT REDUCTION

When low-frequency DCT components are coarsely quantized the blocking artifact can occur. To reduce the blocking artifact the basic method described above can be modified as follows.

Figure 6:
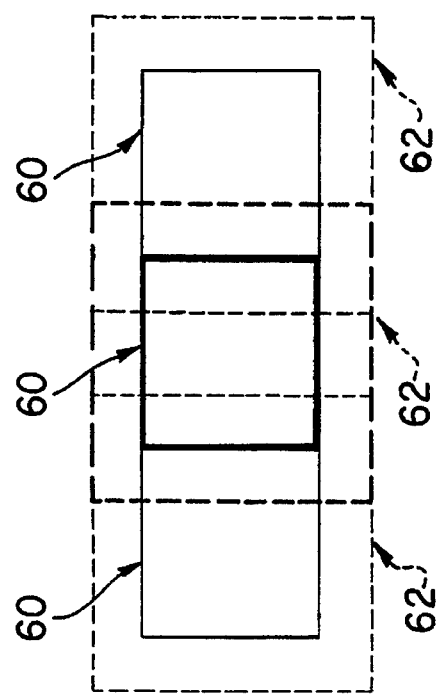
FIG. 6 shows the method of this invention modified to reduce blocking artifacts.

First, a double window scheme is used as shown in FIG. 6. When an 8×8 window 60 is processed, a large outer window 62, typically of size 10 to 16, is built centered about the inner window 60. The data outside the small inner window 60 is used to reduce blocking and is not changed after processing. All the spatial domain procedures use the large window 62, including uniformity checking, segmentation and smoothing as shown in FIG. 4 and uniformity checking, merging, splitting, and smoothing as shown in FIG. 5. By using the large window 62, information in the neighboring inner windows 60 or 8×8 blocks is combined. The DCT domain procedures operate on the inner window and ignore the data outside the center block shown in bold.

Secondly, the treatment of uniform windows is modified. As described above, the uniformity checking is performed in the large window. Each uniform window is first smoothed by a least square plane fitting (in the large window.) Then a projection in DCT and an inverse DCT are followed (in the small window.) This process of operating on the large window for uniformity and smoothing and then the small window for a DCT and projection reduces the blocking artifacts.

Figure 7B:
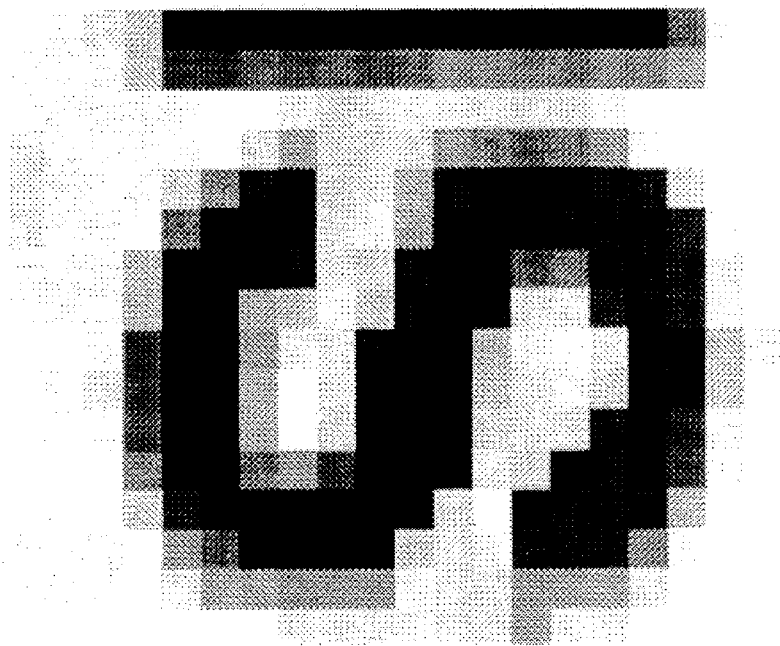
FIG. 7B shows an example of an image reproduced using the method according to this invention.
Figure 7A:
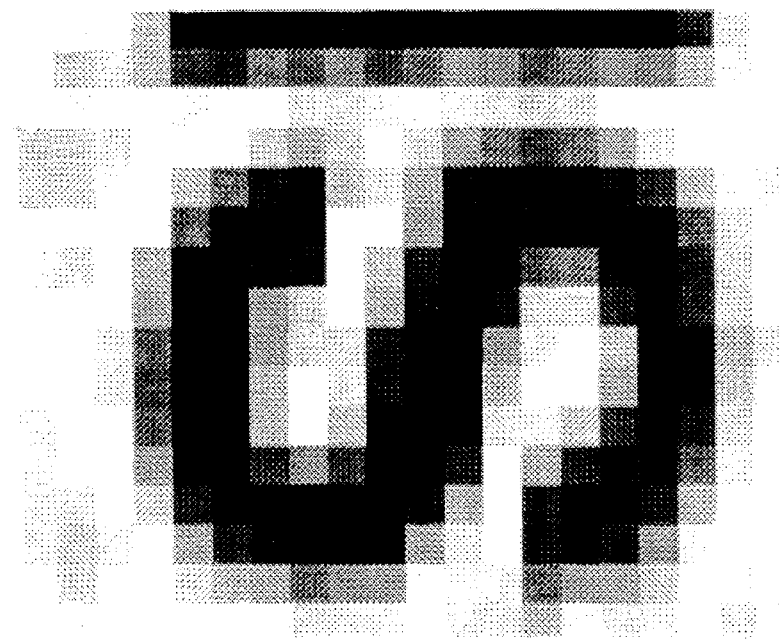
FIG. 7A shows an example of a prior art image reproduced using a standard JPEG process.

Experimental results using the method according to this invention are shown in FIG. 7B illustrating ringing and blocking reduction compared to a standard JPEG prior art process shown in FIG. 7A.

Other variations and modifications of the invention will be apparent to those skilled in the art and would be encompassed by the invention defined by the appended claims.

What is claimed is:

1. A method of decompressing a compressed image which reduces artifacts in a decompressed image, comprising the steps of:

inputting a signal representing a plurality of discrete cosine transform coefficients grouped into blocks, each of the plurality of input discrete cosine transform coefficients representing a corresponding pixel value for a pixel in the compressed image;

determining an initial quantization interval corresponding to each of the plurality of input discrete cosine transform coefficients based on the input discrete cosine transform coefficient;

performing an inverse discrete cosine transform on each block of input discrete cosine transform coefficients to produce a pixel block of a corresponding plurality of pixel values;

examining each pixel block for uniformity in pixel values;

grouping pixels having pixel values within an intensity threshold in each non-uniform pixel block into regions;

smoothing the pixel values for the pixels in each region by low pass filtering;

performing a discrete cosine transform on the smoothed pixel values for the pixels in each block, the discrete cosine transform yielding resultant discrete cosine transform coefficients;

projecting each of the resultant discrete cosine transform coefficients so that the resultant discrete cosine transform coefficients are within the corresponding initial quantization interval;

performing an inverse discrete cosine transform on the resultant discrete cosine transform coefficients to produce a final signal representing final pixel values for pixels corresponding to the decompressed image; and outputting the final signal.

2. The method of claim 1, wherein the step of examining each pixel block for uniformity comprises comparing a range of pixel values for the pixels in each block to a uniformity threshold.

3. The method of claim 1, wherein the step of grouping pixels into regions comprises the steps of:

forming initial regions of connected pixels wherein neighboring pixels have a difference in pixel value smaller than the intensity threshold, and merging neighboring initial regions into a single region in sequence, the merged neighboring initial regions having at most a minimum difference in mean pixel value.

4. The method of claim 1, wherein the step of projecting includes comparing each of the resultant discrete cosine transform coefficients for each block to the corresponding initial quantization interval and correcting the resultant discrete transform coefficients to fit within the initial quantization interval.

5. The method of claim 4, wherein, when the resultant discrete cosine transform coefficients for a block are not within the initial quantization interval, the step of correcting comprises partitioning at least one region of pixels within the block into two regions and repeating the steps of smoothing, transforming and comparing.

6. The method of claim 5, wherein the step of partitioning comprises splitting the last merged region first.

7. The method of claim 4, wherein when the discrete cosine transform coefficients fit generally within the initial quantization interval or a number of merged regions equals an established minimum number of regions, the method proceeds to the step of performing the inverse discrete cosine transform.

8. The method of claim 1, wherein the step of smoothing comprises replacing the pixel values of pixels in an interior of a region with a mean pixel value of pixels in the region, and replacing the pixel value of each pixel in the boundary of the region with a combination of the pixel value of the pixel and the mean pixel value of pixels in the region.

9. The method of claim 1, wherein the step of smoothing further comprises replacing the pixel values of boundary pixels with a pixel value obtained by the following relationship:

$$y(m,n)=\alpha[x]y(m,n)+(1-\alpha)[x]\mu$$

where $y(m,n)$ is the pixel value of a boundary pixel at position $(m,n)$;

$\alpha$ is a pre-set factor satisfying $0 \leq \alpha \leq 1$; and $\alpha$ is the mean pixel value of the region.

10. The method of claim 1, wherein the step of projecting is performed by the following relationships:

$$Z(u,v)=U(u,v) \text{ if } Y(u,v)>U(u,v);$$

$$Z(u,v)=L(u,v) \text{ if } Y(u,v)<L(u,v); \text{ and}$$

$$Z(u,v)=Y(u,v) \text{ otherwise,}$$

wherein $Z(u,v)$ is the output of the projection for $(u,v)$ discrete cosine transform coefficients;

$U(u,v)$ is an upper discrete cosine transform boundary;

$L(u,v)$ is a lower discrete cosine transform boundary; and $Y(u,v)$ is a desirable discrete cosine transform boundary, wherein the upper and lower boundaries are based on the initial quantization interval.

11. The method of claim 1, further comprising:

forming at least one first outer window of pixel values around a corresponding second inner window of pixel values;

using the at least one first outer window for the steps of examining each pixel block for uniformity, forming regions, and smoothing; and using the corresponding second inner window for the steps of performing the discrete cosine transform, projecting and performing the inverse cosine transform.

12. A method of decompressing compressed image data, comprising the steps of:

inputting a signal comprising blocks of discrete cosine transform coefficients, the discrete cosine transform coefficients representative of a compressed image;

establishing discrete cosine transform constraints based on the input discrete cosine transform coefficients;

transforming the blocks of discrete cosine transform coefficients into pixel blocks of intensity values representing pixels;

determining initial pixel intensity values for each of the pixel blocks;

determining uniformity of intensity values for pixels for each pixel block;

forming regions of pixels in each non-uniform pixel block;

replacing the initial pixel intensity values corresponding to pixels in a region with an average pixel intensity value of the respective region to smooth the region;

performing a discrete cosine transform on the intensity values for each pixel block yielding resultant discrete cosine transform coefficients;

projecting the resultant discrete cosine transform coefficients for each pixel block onto the established discrete cosine transform constraints;

performing an inverse discrete cosine transform on the projected resultant coefficients to produce a final signal comprising intensity values for pixels representative of a decompressed image; and outputting the final signal.

13. The method of claim 12, wherein the step of determining uniformity comprises comparing an intensity range of values for the pixels in each block to a pre-set uniformity value threshold.

14. The method of claim 12, wherein the step of projecting comprises comparing the resultant coefficients to the established discrete cosine transform constraints.

15. The method of claim 14, wherein the step of projecting further comprises correcting the resultant discrete cosine transform coefficients to fit within the established constraints.

16. The method of claim 14, wherein when the resultant discrete cosine transform coefficients for a pixel block are not within the established coefficient constraints, the method further comprises partitioning a region in the pixel block into two and repeating the steps of replacing, transforming, and projecting.

17. The method of claim 12, wherein the step of projecting is performed by the following relationships:

$$Z(u,v)=U(u,v) \text{ if } Y(u,v)>U(u,v);$$

$$Z(u,v)=L(u,v) \text{ if } Y(u,v)<L(u,v); \text{ and}$$

$$Z(u,v)=Y(u,v) \text{ otherwise,}$$

wherein $Z(u,v)$ is the output of the projection for $(u,v)$ discrete cosine transform coefficients;

$U(u,v)$ is an upper discrete cosine transform boundary;

$L(u,v)$ is a lower discrete cosine transform boundary; and $Y(u,v)$ is a desirable discrete cosine transform boundary, wherein the upper and lower boundaries are based on the established discrete cosine transform constraints.

18. The method of claim 12, further comprising:

forming at least one first outer window of pixel intensity values around a corresponding second inner window of pixel intensity values;

using the at least one first outer window for the steps of determining uniformity, forming regions, and replacing pixel values; and using the corresponding second inner window for the steps of performing the discrete cosine transform and projecting.

19. The method of claim 12, wherein the step of forming regions comprising the steps of:

forming initial regions of connected pixels wherein neighboring pixels have a difference in intensity value that is smaller than a pre-set intensity value threshold, and merging neighboring initial regions into a single region in sequence, the merged neighboring initial regions having a minimum difference in mean pixel intensity value.

20. The method of claim 12, wherein the step of replacing pixel intensity values comprises replacing the initial pixel intensity value of each pixel in an interior of a region with a mean pixel intensity value of pixels in the region, and replacing the initial pixel intensity value of pixels in the boundary of the region with a combination of the initial pixel intensity value of the pixel and the mean pixel intensity value of pixels in the region.

21. The method of claim 12, wherein the step of replacing pixel intensity values further comprises replacing the initial pixel intensity value of boundary pixels with a value obtained by the following relationship:

$$y(m,n) = \alpha[x]y(m,n) + (1-\alpha)[x]\mu$$

where $y(m,n)$ is the intensity value of a boundary pixel at position $(m,n)$;

$\alpha$ is a pre-set factor satisfying $0 \leq \alpha \leq 1$; and $\mu$ is the mean pixel intensity value of the region.

\* \* \* \* \*